Oct. 28, 1958
H. M. HEUVER
2,857,760
WIND TUNNEL MANOMETER ASSEMBLY INCLUSIVE
OF A TEMPERATURE COMPENSATING AND
PROPORTIONAL CORRECTION DEVICE
Filed May 10, 1956
4 Sheets-Sheet 1.
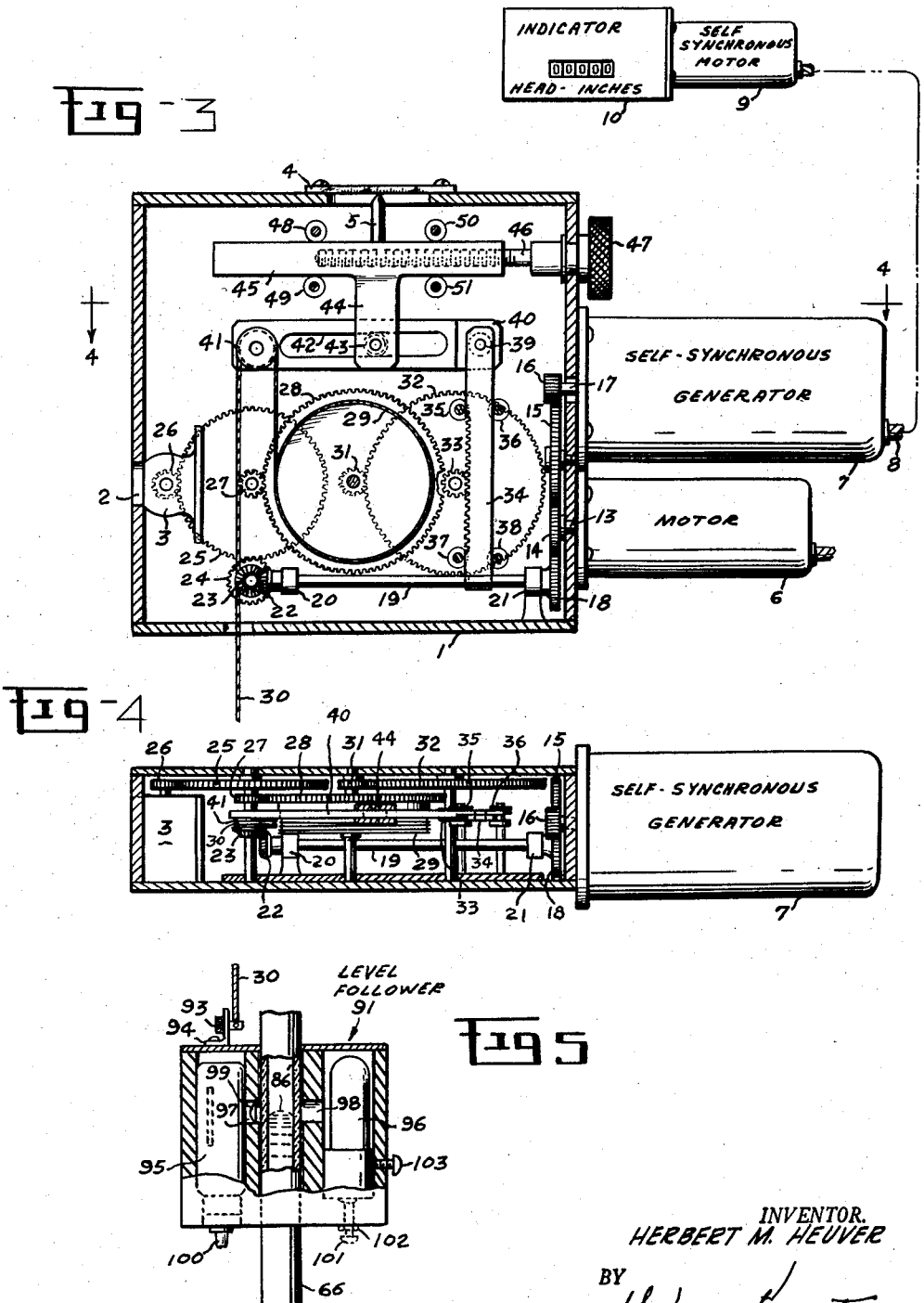
INVENTOR.
HERBERT M. HEUVER
BY
ATTORNEYS

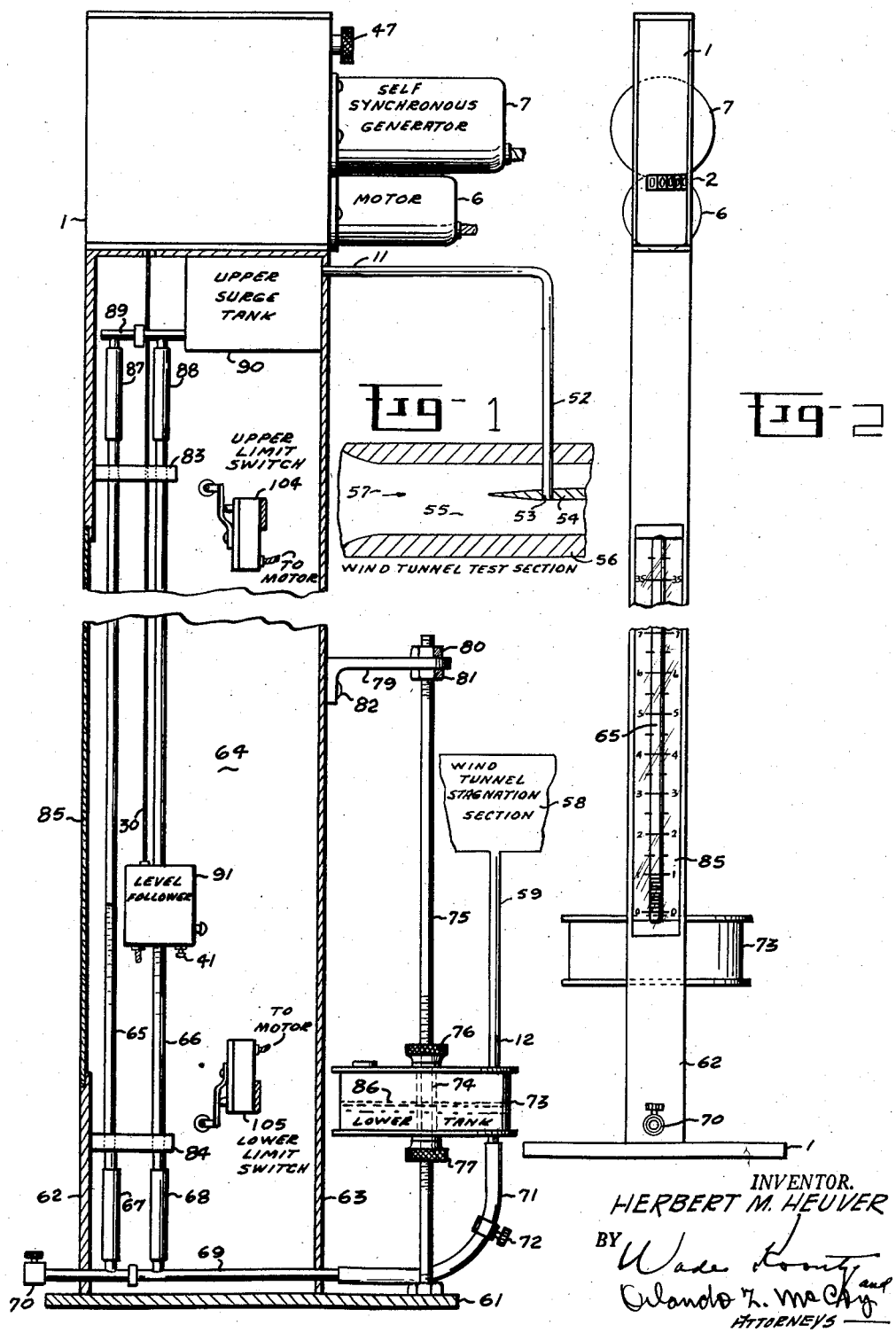

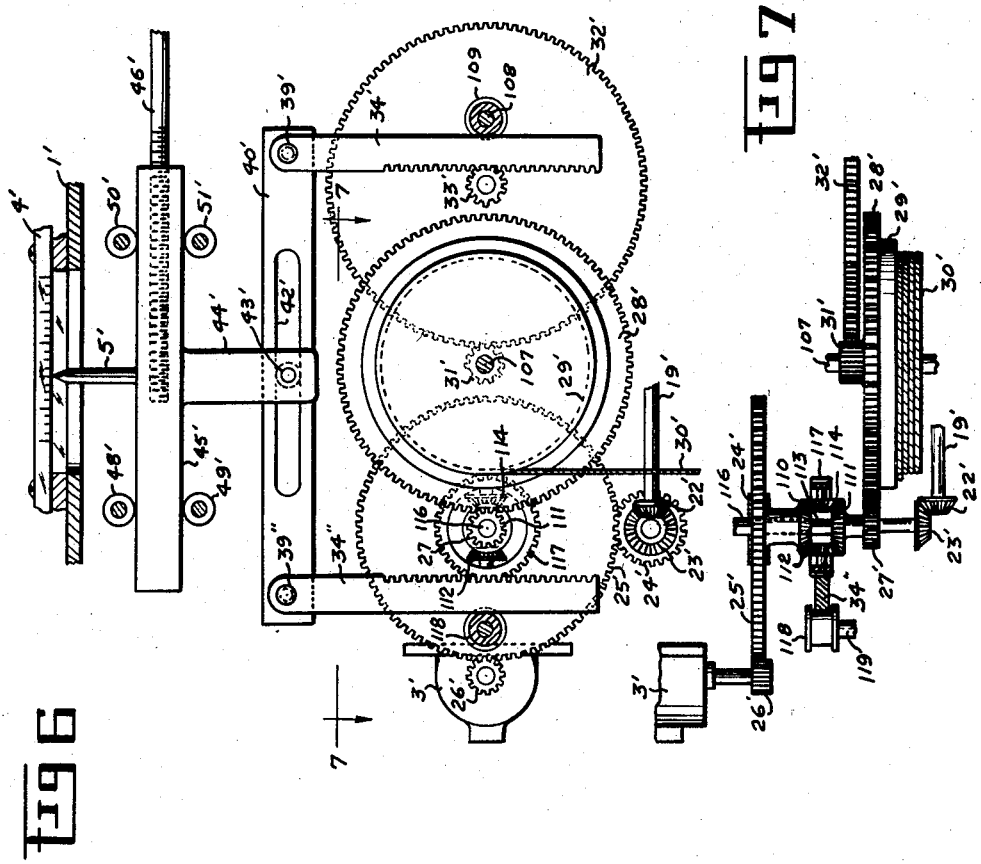

Oct. 28, 1958

H. M. HEUVER 2,857,760

WIND TUNNEL MANOMETER ASSEMBLY INCLUSIVE
OF A TEMPERATURE COMPENSATING AND
PROPORTIONAL CORRECTION DEVICE

Filed May 10, 1956

INVENTOR.
HERBERT M. HEUVER

BY
ATTORNEYS

United States Patent Office 2,857,760
Patented Oct. 28, 1958

2,857,760

WIND TUNNEL MANOMETER ASSEMBLY INCLUSIVE OF A TEMPERATURE COMPENSATING AND PROPORTIONAL CORRECTION DEVICE

Herbert M. Heuver, Dayton, Ohio

Application May 10, 1956, Serial No. 584,156

12 Claims. (Cl. 73—147)

(Granted under Title 35, U. S. Code (1952), sec. 266)

The invention described herein may be manufactured and used by and for the Government for governmental purposes without the payment to me of any royalties thereon.

This invention relates to a wind tunnel manometer assembly inclusive of a temperature compensating proportional correction device which minimizes computations by compensating manometer readings for changes in manometer fluid specific gravity with changes in temperature.

As a background to make the present invention clearly understandable, the aeronautical science has almost throughout its existence done a material part of its earthbound experimentation adjacent a venturi constriction in a wind tunnel. A wind tunnel test section is on the high velocity and low pressure side of the tunnel venturi constriction. A wind tunnel stagnation section is at minimum wind velocity and high pressure within the tunnel. In a representative simple wind tunnel computation a stagnation section wind pressure $p_0$, less a test section wind pressure $p_t$, equals $q$, or $p_0 - p_t = q$. In words the quantity $q$ is the wind pressure difference between the stagnation section and the test section of a subsonic wind tunnel. The quantity $q$ illustratively may be within a range of from zero to about 4000 pounds per square foot, at maximum wind velocity in a subsonic wind tunnel.

A wind tunnel test section commonly is provided with a suitable mount for an airfoil, of which an aircraft wing may be taken as being illustrative. The airfoil is made accessible through a movable door in a side of the test section of the wind tunnel. The door may be mounted to slide sideways or it may be hinged in particular installations. Wind mechanically propelled through the wind tunnel passes through the tunnel test section at desired velocities. A satisfactory reference work applicable to the present invention is entitled "Wind Tunnel Testing" by Alan Pope, second edition, published in 1954 by John Wiley & Sons, Inc. In the Pope book wind tunnel diagrams are shown on page 16 and a picture of a supersonic test section of a wind tunnel is shown in Fig. 12:2 at page 455.

An aircraft wing type of airfoil supports an aircraft above the earth's surface by a resultant force component exerted in a direction opposite to the direction of the earth's gravity pull. An aircraft wing accomplishes the vertical support of an aircraft by wind increased pressure exerted upwardly against the lower surface of the wing augmented by the reduction of pressure upon the upper surface of the wing. With an aircraft in normal horizontal flight, wing lift occurs when the combined vertically positively or upwardly directed force components acting on the wing are of a magnitude exceeding the magnitude of vertically negatively or downwardly directed force components acting on the same wing.

One commonly adopted means for measuring the air pressure differential between the wind pressure pushing upwardly upon the lower surface of an aircraft wing under test and ambient is a manometer tube opening through an orifice in the skin covering the lower surface of the aircraft wing. The manometer tube positive pressure is compared with the stagnation air pressure existing within a wind tunnel at the instant readings are taken. The stagnation air pressure may be approximately barometric pressure in a wind tunnel open to the ambient atmosphere. The stagnation air pressure within a sealed, closed loop type of wind tunnel may differ from the ambient barometric pressure of the atmosphere outside the tunnel.

A barometer commonly used for determining ambient air pressure is a graduated glass tube filled with mercury and inverted in a cup of mercury. The height of the column of mercury in the barometer tube is responsive to changes in atmospheric pressure. A manometer may measure relative pressures from graduations on the two legs of a U-tube containing mercury, alcohol or an equivalent liquid. One limb of a manometer U-tube is connected to a first air pressure source and the other limb is connected to another air pressure source. An apparatus for determining pressure distribution on airfoils or the like, is discussed and is explained in U. S. Letters Patent No. 2,390,534 issued December 11, 1945 to Herbert M. Heuver. The photograph of an operator seated before and reading a battery of manometer tubes in a wind tunnel installation at Langley Air Force Base appears on page 152 of Life Magazine, dated November 21, 1955. A chart of the densities and the volumes of mercury with changes in temperature appears on page 1955 of Handbook of Chemistry and Physics, 35th edition, published in 1954 by the Chemical Rubber Publishing Company, Cleveland, Ohio, and ranges from a volume of 0.0734205 cc. per gram at a temperature of $-10°$ C. to a volume of 0.0748939 cc. per gram at a temperature of 100° C., a difference of 0.0014734 cc. per gram over this temperature range. It will be apparent that volume change of the fluids within the manometer tubes will be a factor in the making of determinations in wind tunnel work, whether that fluid be mercury, alcohol, or another material. The present invention concerns a device for use in compensating for volume changes with temperature changes in the mercury within the manometer tubes and tanks, which heretofore has required laborious computations.

A general statement of the nature and of the substance of the present invention, in harmony with, coextensive with and commensurate with the present invention as claimed, is that the nature of the present invention is to provide a new and an improved wind tunnel manometer assembly which is accurately, simply, easily and automatically adjusted to compensate for changes in mercury volume with temperature changes and which thereby minimizes errors arising from human fraility during long and tedious mathematical and physical computations required heretofore in the making of comparable determinations. The substance of the present invention is a new and improved complete wind tunnel test section temperature compensated dynamic and static wind pressure indicating manometer assembly, comprising a manually adjustable, automatically registering, motor driven gear train and lever assembly, inclusive of a cable on its drum, with the cable played out and reeled in, in response to the sign and the magnitude of electrical signals originating at a manometer tube meniscus as it fluctuates in response to changes between the stagnation or barometric pressure applied to the liquid-gas interface in a lower mercury containing tank, with which a manometer tube is connected, and the dynamic pressure in the test section of a wind tunnel applied to a liquid-gas interface in an upper surge tank with which the same manometer tube is connected.

A general object of the present invention commensurate with the invention, as claimed, is to provide a new and an improved successfully operable wind tunnel manometer fluid density compensating device which may be accurately, readily and easily adjusted to the precise temperature at which readings are made.

A further object is to provide a complete manometer installation for wind tunnel operation automatically compensating for changes in the specific gravity of the manometer fluid caused by changes in temperature.

Another object is to provide an adjustable, accurately operating mechanical device for dependably minimizing the long, elaborate, time consuming and exhausting computations which are required in the conversion of manometer bank readings into terms of the sense and the magnitude of the lift forces acting upon selected surface areas of an airfoil within the test section of a wind tunnel.

Another object is to provide a new and an improved, automatically and continuously operating device for accurately indicating changing positions of a fluctuating fluid level in its container.

Another object is to provide a device for automatically and continuously adjusting to differences in gas pressures.

A successfully operative embodiment of the present invention is shown in the accompanying drawings wherein:

Fig. 1 is a side elevational view, partly in section and partly fragmentary, of a wind tunnel manometer with a temperature compensating and proportional correction device which embody the present invention;

Fig. 2 is an edge elevational view from the left of the manometer part of the assemblage shown in Fig. 1;

Fig. 3 is a side elevational view, partly in section, of a temperature compensating and proportional correction device which is a part of the assembly shown in Fig. 1;

Fig. 4 is a section taken along the line 4—4 on Fig. 3;

Fig. 5 is a fragmentary elevational view, partly broken away and in section, of an automatically adjusting meniscus level follower or phototube pickup, part of the assembly shown in Fig. 1;

Fig. 6 is a diagrammatic, fragmentary side elevational view of a modification of the temperature compensating and proportional correction device shown in Fig. 3;

Fig. 7 is a fragmentary view partly in section taken from the line 7—7 on Fig. 6;

Figure 8:
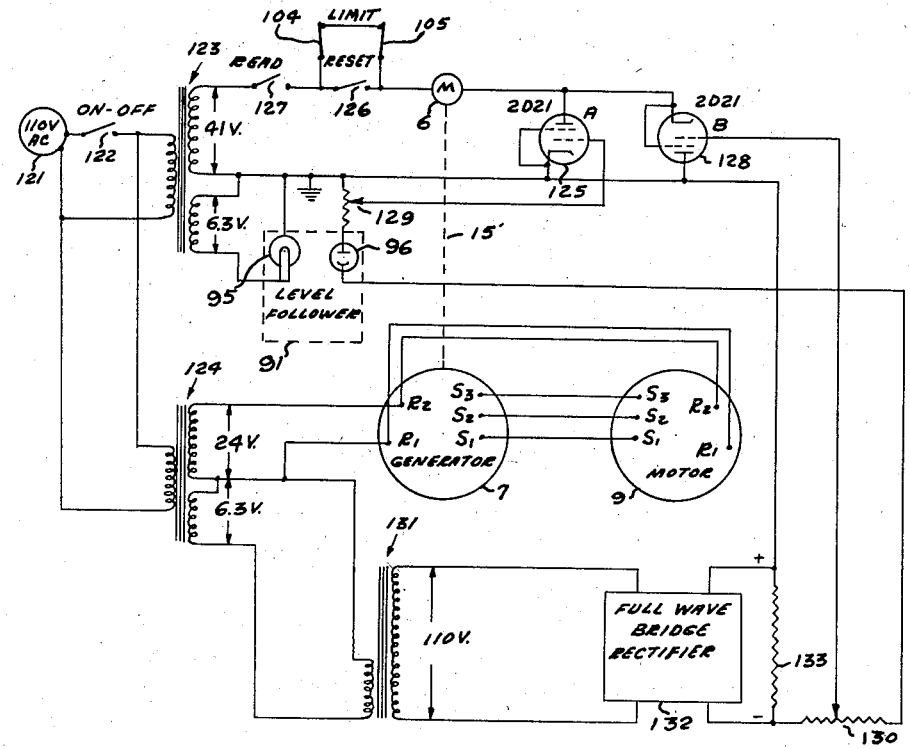
Fig. 8 is an electronic, schematic circuit diagram associating and actuating the relationship between the manometer meniscus level follower and the motor of the assembly shown in Fig. 1.

In Figs. 1 and 2 of the accompanying drawings is shown a wind tunnel manometer assembly which embodies the present invention. The assembly includes a temperature compensating and proportional correction device within a housing 1. The proportional correction device comprises a motor driven gear train, an adjustable lever and a cable drum. Readings from the operation of the assembly may be read directly through a window in the housing 1 and may be transmitted to a remote point by the operation of a self-synchronous generator, cable and indicator. Recordings of the operation of the assembly may appear in the experimental room of a wind tunnel or the like.

Adjustments compensating for the changes in volume of mercury within the manometer tubes of the equipment with changes in temperature are accomplished by the adjustment of a knurled knob 47. A cable 30 extending downwardly from within the housing 1 controls the vertical position of a mercury meniscus level follower 91, and in turn is controlled by the position of the mercury meniscus within a transparent tube 66 of a manometer assembly supported upon a base 61. A second mercury meniscus within a second transparent tube 65 is read directly through a scale bearing glass plate 85 and is on a common level with the meniscus within the tube 66.

The manometer assembly supported upon the base 61 is housed within end walls 62 and 63 and side walls, of which one side wall 64 is shown and the nearer side wall is removed. The base 61 preferably is maintained level by corner levelling screws, not shown.

The manometer assembly is connected by a surge upper tank tube 11 and a pipe 52 with an orifice 53 opening through a surface of an airfoil such as an aircraft wing 54 within the test section 55 of a wind tunnel 56. The wind tunnel test section 55 is on the high velocity side of a venturi constriction 57. The manometer assembly is connected by a lower tank connecting tube 12 and a pipe 59 to the stagnation pressure of the air within the wind tunnel 56 applied to the surface of the mercury 86 within the lower tank 73.

The manometer housing incloses the pair of glass manometer tubes 65 and 66 which are transparent and which are supported from the housing side wall 62 by support clamps 83 and 84. The graduated glass window 85, shown in Fig. 2 of the drawings, is mounted in the housing end wall 62 and permits visual access to the meniscus level of the mercury 86 within the direct reading manometer tube 65. The manometer tubes 65 and 66 are connected at their lower ends by rubber tubes 67 and 68 to a lower header tube 69.

The lower header tube 69 terminates at one end toward the left in a drain valve 70 and is connected at its opposite end by a slack rubber tube 71 to the bottom of the well or lower tank 73. The lower tank 73 is made adjustable for height. A closure clamp 72 on the slack rubber tube 71 may releasably stop the conduction of the mercury or fluid 86 therethrough.

The lower tank 73 has an axially extending, centrally positioned hollow tube 74 between its upper and its lower walls and sealed thereto against the loss of fluid from the tank. The hollow tube 74 makes a sleeve fit on an upwardly extending rod 75, to slide axially thereof. The tank 73 is adjustably supported on the rod 75 by the operation of a pair of thumb nuts 76 and 77 positioned above and below the tank 73, respectively.

The rod 75 is supported at its lower end by the base 61 and at its upper end by a bracket 79 between nuts 80 and 81 which thread on the upper end of the rod 75. The bracket 79 is secured, as by rivets 82 or the like, to the manometer housing end wall 63.

The upper ends of the manometer tubes 65 and 66 are connected by rubber tubes 87 and 88, respectively, to an upper header 89. The upper header 89 is sealed at its end remote from the surge tank 90. The upper header 89 is connected with an upper surge tank 90 which outlets through the tube 11 to the wind tunnel test section.

The wind tunnel stagnation section pressure of the gas in the tube 12 is applied to the surface of the mercury or other liquid 86 within the lower tank 73 and is opposed by the wind tunnel test section dynamic pressure of the gas in the tube 11 and in the pipe 52. The wind tunnel test section dynamic pressure is applied in parallel to both meniscus surfaces in the manometer tubes 65 and 66. The pressure difference between the gas pressures in the tubes 11 and 12 establishes and maintains the meniscus levels within the manometer tubes 65 and 66.

The proportional correction device which is disclosed herein is adapted by operation by the knurled knob 47 for adjustment in response to temperature changes. Temperature changes alter the density and the specific gravity of the mercury 86 within the manometer tubes 65 and 66 and within the lower tank 73.

A toroidal level follower or photocell pickup device 91, which is shown in fragmentary section in Fig. 5, makes a sleeve fit on the concealed manometer tube 66 so that it may slide axially therealong. The level follower or pickup device 91 is attached to the lower end of the cable 30, as by means of a bolt and thumb nut 93, or the like. The bolt and thumb nut 93 are secured in an aperture in a bracket 94 which is riveted to the upper plate of the pickup device 91.

The level follower 91 contains a light source 95 and a photocell tube 96. On opposite sides of the tube 96 are aligned light conducting apertures 97 and 98 which conduct a light beam from the light source 95 to the photosensitive tube 96. A light collimating lens 99 preferably is inserted in the light path so that parallel beams of light pass and are tangent to the center of the upper curved meniscus 86' of the mercury within the tube 66. Electrical energy is supplied to the light source 95 by means of an input lead 100. The phototube 96 also is provided with an electrical connection, not shown in Fig. 5 but shown in Fig. 8 of the operating circuit diagram of the device. A vertically adjustable screw 101, secured in an adjusted position by a locknut 102, extends upwardly through the base of the pickup device 91 to adjust and secure the photoelectric tube 96 vertically within its housing. The photoelectric tube 96 is secured rotatably in its adjusted position by a laterally extending set screw 103 which threads through the side wall of the pickup device 91.

Displacement of the pickup device 91 longitudinally of the concealed manometer tube 66 is limited by upper and lower limit switches 104 and 105, respectively, shown structurally in Fig. 1 and in circuit in Fig. 8. Each limit switch comprises a normally closed, push button switch within a housing to which one end of a leaf spring is riveted. Each leaf spring carries at its unattached end a roller which is engaged by the pickup device 91. The depression of the push button in either of the limit switches stops the motor 6 and any corresponding directional movement of the cable 30.

The wind pressure at the orifice 53 in the skin of the airfoil 54 within the test section 55 of the wind tunnel 56 is conducted by the pipe 52 and the tube 11 and is applied to the interior of the surge tank 90, to the upper header 89 and to the upper parts of the manometer tubes 65 and 66. The wind pressure at the orifice 53 of the airfoil 54 is opposed by the wind tunnel stagnation pressure at the lower tank connection tube 12. This pressure opposition within the manometer establishes the meniscus levels within the manometer tubes 65 and 66.

The proportional correction device which is shown in Figs. 3 and 4 of the accompanying drawings is substantially enclosed within the housing 1. An aperture 2 in the housing 1 permits the reading directly of an indicator 3. A second aperture covered by a transparent window 4 bearing a temperature graduated scale permits the observation of a manually adjusted pointer 5. The position of the pointer 5 along the temperature graduated scale on the window 4 is controlled by the operation of the knob 47 which is journaled in the wall of the housing 1 for its operation from the outside of the housing. The housing 1 also has attached thereto a motor 6 and a generator 7. The generator 7 is connected by a cable 8 with a motor 9 which operates an indicator 10, a printer or the like, at a remote point. The housing 1 also is apertured for the passage therethrough of the cable 30. The motor 6 preferably is a direct current reversible motor. The generator 7 and the motor 9 are self-synchronous units of a control system.

Power for the device within the housing 1 of Fig. 3 is provided from the shaft 13 of the motor 6. The motor shaft 13 drives a spur gear 14 which engages to turn gears 15 and 16. The gear 16 turns a shaft 17 of the self-synchronous generator 7. The motor driven spur gear 14 also engages to turn another gear 18 on a shaft 19. The shaft 19 is journaled for rotation in bearings 20 and 21 positioned adjacent the opposite ends of the shaft 19. The bearings 20 and 21 are supported by the housing 1.

The shaft 19 has a bevel gear 22 on its end remote from the gear 18. The bevel gear 22 engages to drive a second bevel gear 23. The second bevel gear 23 is on a stub shaft with its opposite ends journaled in the housing 1, as shown in Fig. 4. The bevel gear 23 is integral with a plane gear 24. The peripheral teeth of plane gear 24 engage to turn a large plane gear 25. The large plane gear 25 turns a small gear 26 operating a number system in the indicator 3. The appearance of the indicator 3 in Fig. 3, viewed from the left is that of an ordinary counter or register, such as the counter 2 in Fig. 2 and the counter 10 in Fig. 3. The large plane gear 25 has at its center a small gear 27 which engages to turn another large gear 28. The large gear 28 is coaxial with and is attached to a cable drum 29 upon which a cable 30 is wound. The cable 30 in linear motion is played out or is wound in upon the cable drum 29 by operation of the reversible motor 6. Angular displacement, in a similar manner, may be derived from the shaft of the gear 28 projected through the side of the housing 1, not shown.

The cable drum gear 28 has at its center a small gear 31 which engages to drive another large gear 32. The large gear 32 has at its center, a pinion gear 33 with peripheral teeth which engage teeth on a rack 34. The rack 34 is held in alignment for straight line motion by a plurality of rollers 35, 36, 37 and 38.

The rack 34 has its upper end rotatably secured by a pin 39 to the right hand end, or the force end, of a beam arm or a lever 40. The lever 40 has a cable loaded pulley wheel 41 mounted for rotation on its left hand or load end. The lever 40 has an elongated slot 42 extending between its ends. The lever 40 is supported intermediate its ends by a fulcrum wheel or a roller 43 which is positioned within the lever slot 42 for movement in either direction longitudinally of the lever.

A fulcrum roller 43 is mounted for rotation adjacent the lower end of a lever supporting yoke or pair of depending arms 44. The yoke 44 depends from midway between the ends of a guide bar 45. The guide bar 45 is threaded internally for the adjustable insertion therein of a manually operated screw 46. The screw 46 is journaled in a side of the housing 1 and is turned by operation of a knurled screw head or a knob 47 which is positioned outside of the housing 1. The guide bar 45 is supported for axial movement by rollers 48, 49, 50 and 51 which are journaled on shafts secured in the wall of the housing. The guide bar 45 carries the pointer 5 along the adjustment indicating scale on the glass window 4. The rotation of the adjusting screw 46 alters the position of the fulcrum roller 43 with respect to the midpoint between the ends of the lever 40.

The energization of the motor 6 causes the pinion 33 to impart up or down linear movement to the rack 34. The rack 34 thereby may impart movement in one direction to the right hand end of the lever 40 and movement in the opposite direction to the differential pulley 41 on the left hand end of the lever 40. The energization of the motor 6 also turns the cable drum 29 which, together with the movement of the differential pulley 41, alters the suspended length of the cable 30.

The energization of the motor 6 through the positioning control system shown, also causes both of the counters, registers or indicators 3 and 10 to assume changes in readings that remain in agreement. Change in the reading of the counter 3 is accomplished from the motor 6 through the shaft 19. Change in the readings of the counter 10 is accomplished from the generator 7 through the cable 8, as previously described.

A modification of the proportional correction device contemplated hereby is shown in Figs. 6 and 7 of the accompanying drawings. Elements in Figs. 6 and 7 which are comparable with elements in Figs. 3 and 4 bear the same reference numerals primed in Figs. 6 and 7.

The device in Figs. 6 and 7 distinguishes from that in Figs. 3 and 4 by the addition in Figs. 6 and 7 of a second rack 34'' depending from a pin 39'' in the left hand end of the lever 40' and by the gear arrangement.

The motor driven shaft 19' transfers power through bevel gears 22' and 23' to a shaft 116 and to an epicyclic train or a differential motion gear assembly comprising gears 110, 111, 112 and 113. The differential motion gear assembly comprises a pair of intermediate bevel pinion gears 112 and 113 carried by a large gear 117. The large gear 117 has peripheral teeth which engage the second rack 34″. The second rack 34″ is supported in its vertical movement by a peripherally grooved wheel 118 on its shaft 119.

In the operation of the complete assembly, when the gas pressure at the input tube 11 is sufficiently less than the gas pressure in the input tube 12, the level of the mercury in the manometer tube 66 rises and arrests the passage of light from the light source 95 to the photosensitive tube 96. Under this circumstance the motor 6 is energized in one direction and operates to reel in the cable 30 and to lift the level follower or pickup device 91. As the level follower 91 is caused to move upwardly of the tube 66, light from the light source 95 is interrupted by the mercury column and changes the conductance of the light sensitive tube 96 to stop the motor 6. Stopping the motor 6 in turn stops the travel of level follower 91. Hunting of the level follower 91 above and below the level of the meniscus 86′ is minimized by the circuitry shown in Fig. 8 of the drawings, as indicated in the "dead band" of the graph of Fig. 9. This state of balance is maintained as long as a constant electromotive force passes the phototube 96.

Conversely, when the gas pressure at the input tube 11 is sufficiently greater than the gas pressure in the input tube 12, the level of the mercury in the manometer tube 66 falls and the direct passage of light from the light source 95 through the collimating lens 99 is applied in constant full magnitude upon the photosensitive tube 96. The motor 6 is then energized in the opposite direction and operates the cable drum 29 to lower the level follower 91. The motor 6 continues to lower the level follower 91 until the mercury meniscus 86′ is engaged by the collimated light beam from the light source 95 when the motor 6 is deenergized in its direction of operation and the movement of the level follower 91 is arrested.

In this manner the level follower 91 is maintained at the meniscus level of the mercury 86 within the manometer tube 66 by operation of the proportional correction device which is described herein.

Hunting about a balance point, where light from the light source 95 just passes the meniscus 86′ of the mercury, or other manometer fluid 86 within the manometer tube 66, is minimized by the circuit shown in Fig. 8 of the drawings. The degree of illumination arriving at the photosensitive tube 96 and of a magnitude to hold the cable operating motor 6 inactive, is indicated by the "dead band" in Fig. 9 of the circuit operation. The adjustment of the thumb screw 47 in Figs. 1 and 3 to turn its shaft 46, or its counterpart shaft 46′ in Fig. 6, compensates for changes in the specific gravity of the manometer fluid 86 with temperature changes by changing the lengths of the moment arms between the fulcrum and the force application points at the ends of the levers 40 and 40′.

In the circuit of Fig. 8, electric power from a 110 volt alternating current source 121 is applied through an on-off switch 122 in parallel across the primary windings of a pair of step-down transformers 123 and 124. The transformers 123 and 124 are both iron core transformers with split secondary windings.

The upper secondary winding of the transformer 123 is connected through a closed, normally open, reading switch 127 and normally closed limit switches 104 and 105 in series with the motor 6 across the plate and cathode electrodes of a first vacuum tube 125. The limit switches 104 and 105 are shunted by a normally open reset switch 126. A 41 volt potential from the upper secondary winding of the transformer 123 is only applied to the motor 6 and across the plate and cathode electrodes of the first tube 125 when the reading switch 127 is closed.

A second vacuum tube 128 has its cathode electrode connected to the plate electrode of the first tube 125 and the second vacuum tube 128 has its plate electrode connected to the cathode electrode of the tube 125. The control grid electrode of the tube 125 is returned to ground through an adjustable contact of a variable resistor 129. The resistor 129 contact remote from ground is connected through the light sensitive photoelectric tube 96 in the level follower 91 and through a resistor 130 to its adjustable tap which in turn is connected to the control grid electrode of the second tube 128. The light source 95 in the level follower 91 is energized by a 6.3 volt potential conducted by the lead 100 from the lower secondary winding of the transformer 123.

The upper secondary winding of the transformer 124 provides a 24-volt potential across the contacts R1 and R2 of both the self-synchronous generator 7 and its motor 9. A mechanical coupling 15′ between the motor 6 and the generator 7 makes the generator 7 responsive to the action of the motor 6.

The lower secondary winding portion of the transformer 124 supplies a 6.3 volt potential to the primary winding of a step-up transformer 131. The secondary winding of the step-up transformer 131 supplies a 110 volt alternating current potential to a full wave bridge rectifier 132. The positive output terminal of the rectifier 132 supplies positive plate potential to the tube 128. The negative output terminal of the rectifier 132 is connected through the resistor 130 and the light sensitive photoelectric tube 96 to the ungrounded end of the resistor 129. The terminals of the rectifier 132 are shunted by a resistor 133.

Figure 9:
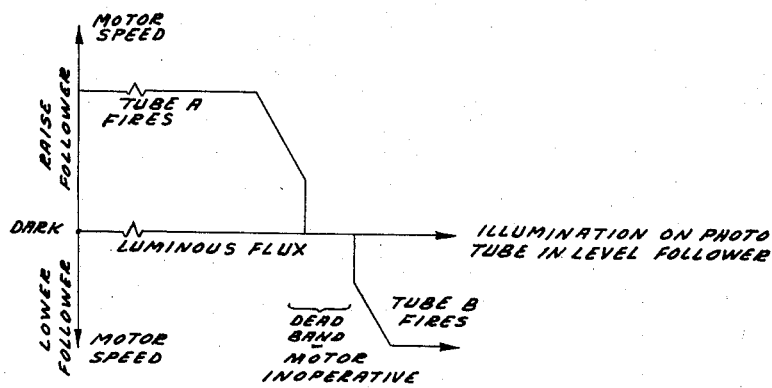
Fig. 9 is a graphical operating diagram of the circuit shown in Fig. 8.

The sketch in Fig. 9 indicates the performance of the tube 125 or A and the tube 128 or B, of the circuit in Fig. 8, in minimizing hunting about the meniscus 86′ in the level follower 91.

Similarly functioning modifications in the parts of the devices, in the devices and in the procedures which are disclosed herein may be made without departing from the scope of the present invention.

What I claim is:

1. A wind tunnel manometer assembly inclusive of a temperature compensating and proportional correction device for use in the making of pressure determinations on an airfoil in the test section of a wind tunnel as compared with the stagnation section of the wind tunnel, comprising two parallel manometer transparent tubes of which one is visually accessible and the other is concealed with each of the tubes having the same level liquid-gas interface meniscus positionable longitudinally of the tube in response to an air pressure differential between one pressure of tunnel stagnation applied to the liquid within the manometer tube and conducted thereby to the liquid side of the meniscus and a second pressure of tunnel test section applied to the gas side of the meniscus, a level follower means movable longitudinally of the concealed tube and indicating by electrical signal any change in the meniscus position longitudinally of the concealed manometer tube, a motor driven gear train and cable drum assembly sensitive to the electrical signal from the level follower means in adjusting the level follower means in registration with the meniscus position longitudinally of the manometer tube, and a lever means adjustable to changes in temperature and influencing the gear train and cable drum assembly in adjusting the position of the level follower means longitudinally of the manometer tube.

2. The manometer assembly defined in the above claim 1 inclusive of an indicator registering motion in the motor driven gear train and cable drum assembly.

3. The manometer assembly in the above claim 1 inclusive of light sensitive means within the level follower means and producing electrical signal on a change in the meniscus position longitudinally of the manometer tube.

4. The manometer assembly defined in the above claim 1 inclusive of an electrical circuit conducting electrical signal from the level follower means to the motor driven gear train and cable drum assembly in causing the level follower means to remain in registration with the meniscus within the manometer tube.

5. The manometer assembly defined in the above claim 1 inclusive of a wind tunnel provided with a test section and a stagnation section, an upper surge tank connected to an orifice in a surface of an airfoil within the test section of the wind tunnel, and a lower tank containing manometer fluid to the surface of which pressure from the wind tunnel stagnation section is applied.

6. The manometer assembly defined in the above claim 1 inclusive of limit switch means actuated by the level follower means and for arresting the linear travel of the level follower means longitudinally of the manometer tube.

7. A wind tunnel manometer reading proportional correcting device, comprising in combination with a wind tunnel manometer having a liquid column meniscus exposed to pressure variations inside the wind tunnel, with a lever transversely displaceable at both of its ends, a horizontally maintained fulcrum supporting the lever intermediate the ends thereof, means for adjusting the fulcrum along the lever, a toothed rack depending from a first end of the lever, a pinion engaging the rack, roller means engaging the lateral edges of the rack for maintaining the rack and the pinion in engagement with each other, and means driving the pinion in raising and in lowering a second end of the lever as a proportional correction of the position thereof in maintaining registration with the liquid column meniscus.

8. The device defined in the above claim 7, inclusive of indicator means actuated from the pinion driving means and variable with the extent of the proportional correction of the second end of the lever, and cable means depending from the second end of the lever remote from the rack and actuated from the pinion driving means.

9. A manometer reading proportional correction device, comprising a manometer with a pressure sensitive fluid-gas interface meniscus detected by light ray incidence, a movable cable supported level follower provided with a photoelectric means sensitive in terms of electrical signal to manometer meniscus changes in position, and a level follower position change indicator responsive to signal input from the photoelectric means, with a housing, a motor attached to the housing, a lever within the housing, a fulcrum supporting the lever, fulcrum supporting means adjustable longitudinally of the lever from outside the housing and supported by the housing so that the fulcrum is maintained in the same horizontal plane for all of its positions, rack means depending from an end of the lever, gear train means transmitting power from the motor to the rack means for actuating the lever, a cable drum borne by a gear of the gear train means and having a length of cable wound thereon, and a cable loaded pulley journaled on the lever end remote from the rack whereby the motor operation controls the length of cable supported by the cable loaded pulley.

10. A fluid pressure reading proportional correction device, comprising a manometer system having a liquid level follow-up device emitting electrical signal indicative of manometer changes in sign and in magnitude, with a housing, a lever within the housing, a horizontally level maintained fulcrum supporting the lever, guide bar fulcrum supporting means on rollers supported by the housing and the guide bar being adjustable to move the fulcrum along the lever between the ends thereof, a roller guided rack depending from a lever first end, a pinion moving the lever first end through the rack, motor means driving the pinion through a gear train, cable means inclusive of a cable wound upon a cable drum supported by a gear of and actuated by the gear train, and means applied to the cable from the lever second end for proportional correcting the cable actuation.

11. A fluid pressure proportional correction device, comprising a fluid pressure system inclusive of a manometer having a fluid surface sensitive to changes in air pressure, electrical means emitting signal characteristic of manometer changes, in combination with a lever, a horizontally maintained rotatable fulcrum wheel supporting the lever between its ends, an axially threaded guide bar supported for linear motion parallel to the lever and provided intermediate its ends with a depending yoke supporting the lever supporting fulcrum wheel, a fulcrum wheel adjusting screw threaded axially into the guide bar, a rack with teeth along one edge and journaled at its upper end on one end of the lever and restricted to linear motion substantially normal to the lever, a pinion gear engaging the rack teeth for imparting movement to both the rack and to the lever, a pulley wheel rotatably mounted on the lever end remote from the rack, a motor for driving the pinion through a gear train, and a cable drum part of the gear train and supplying a cable over the pulley wheel on the lever responsive to the actuation of the motor and of the setting of the guide bar screw.

12. A fluid pressure proportional correction device, comprising a manometer system having a liquid level follow-up device emitting an electrical signal indicative in sign and an amplitude of changes in the manometer liquid level, and an indicator of the direction and the distances of changes in the manometer liquid level, in combination with a lever supported intermediate its ends by a fulcrum wheel roller adjustably positionable longitudinally of the lever for changing the moment arms between the fulcrum and the lever ends, means for adjusting the fulcrum longitudinally of the lever, a first rack with one end connected to a first end of the lever and extending substantially normally thereto, a second rack with one end connected to a second end of the lever and extending substantially normally thereto, gear train means inclusive of a pinion engaging the first rack to actuate the lever first end, a cable drum in the gear train means and actuated thereby in altering a length of cable on the cable drum, and an epicyclic gear arrangement including a large gear engaging the second rack and operated by the lever second end.

References Cited in the file of this patent

UNITED STATES PATENTS

| | | |
|---|---|---|
| 2,376,459 | Stevens | May 22, 1945 |
| 2,684,590 | Lassman | July 27, 1954 |
| 2,704,342 | Fielden | Mar. 15, 1955 |
| 2,705,888 | Sedgwick | Apr. 12, 1955 |
| 2,722,641 | Cross | Nov. 1, 1955 |
| 2,818,726 | Amonette et al. | Jan. 7, 1958 |